US006146265A

United States Patent [19]
Greenwald

[11] Patent Number: 6,146,265

[45] Date of Patent: Nov. 14, 2000

[54] VEHICLE AIR OUTLET ASSEMBLY

[75] Inventor: Pamela Sue Greenwald, Sterling Heights, Mich.

[73] Assignee: Delphi Technologies, Inc., Troy, Mich.

[21] Appl. No.: 09/473,438

[22] Filed: Dec. 28, 1999

[51] Int. Cl.[7] .................... B60H 1/34

[52] U.S. Cl. .................... 454/155; 251/901; 454/324

[58] Field of Search .................... 454/76, 78, 155, 454/152, 143, 324, 334; 251/901

[56] References Cited

U.S. PATENT DOCUMENTS

| | | | |
|---|---|---|---|
| 4,517,809 | 5/1985 | Hoyt | 251/901 X |
| 4,887,520 | 12/1989 | Bauer | 454/155 |
| 5,338,252 | 8/1994 | Bowler et al. . | |
| 5,584,098 | 12/1996 | Koyama et al. | 454/155 X |

FOREIGN PATENT DOCUMENTS

| | | | |
|---|---|---|---|
| 3190 | 8/1899 | Denmark | 454/334 |
| 39 27 217 | 8/1990 | Germany | 454/155 |

*Primary Examiner*—Harold Joyce
*Attorney, Agent, or Firm*—Kathryn A. Marra

[57] ABSTRACT

A vehicle air outlet assembly having a sliding shutoff door for blocking and unblocking air therethrough. The assembly includes a housing having a tubular form including inlet and outlet ends and defining an air passage between the ends. The shutoff door is movable between an open position along one side of the housing and a closed position across the inlet end of the housing to block air flowing through the housing. The door is made from a plurality of panels hingedly connected together. Followers such as pins are disposed along laterally opposite edges of the panels. Guides or tracks are formed on opposite sides of the housing and receive the pins for guiding sliding movement of the door between open and closed positions, respectively, unblocking and blocking the inlet end of the housing. Actuating means are connected with one of the door panels for sliding the door panels between the open and closed positions. The door uses less volume within the housing by sliding into one of the sides of the housing rather than rotating within the housing.

5 Claims, 3 Drawing Sheets

VEHICLE AIR OUTLET ASSEMBLY

TECHNICAL FIELD

The present invention relates to air outlet structures for heating and air conditioning systems for vehicles such as automotive, aircraft and small marine craft, and more particularly to a door for controlling the volume of air through the air outlet structure.

BACKGROUND OF THE INVENTION

It is known in the art relating to air outlet structures for automotive vehicles to provide a butterfly valve or door upstream from an airflow directionality control device to control the volume of air through the control device. The valve may be a conventional circular, oval or rectangular plate member. The valve may be mounted on a shaft to rotate the valve within the air outlet between open and closed positions.

The configuration of the valve is such that when the valve is in the closed position, it seals against the walls of the air outlet, blocking the airflow therein. A problem with this configuration is that the valve inherently consumes more packaging volume in the fore and aft direction, or open position, due to the design. The air outlet duct must be longer than is necessary to accommodate the diameter or width of the valve. Therefore, it is desirable to provide a shutoff valve or door that requires less space within the air outlet distribution system.

SUMMARY OF THE INVENTION

The present invention provides a shutoff door for a vehicle air outlet assembly that uses less space within the air outlet assembly than a conventional shutoff valve or door. Also, the configuration of the door allows less material to be used to construct the air outlet. Further, the length of the air outlet assembly is reduced resulting in less consumption of a vehicle's interior compartment.

The air outlet assembly of the present invention includes a housing having a tubular form and inlet and outlet ends. An air passage is defined between the ends. A sliding shutoff door is movable between an open position along one side of the housing and a closed position across the inlet end of the housing to control the volume of air flowing through the air outlet assembly. The door has a plurality of panels hingedly connected together. Followers are located along laterally opposite edges of the panels. Guides are formed on opposite sides of the housing and receive the followers for guiding sliding movement of the door between open and closed positions, respectively, unblocking and blocking the inlet end of the housing to the passage of air therethrough. Actuating means are connected with one of the door panels for sliding the door panels between the open and closed positions. By having the door slide into a side of the housing, the door uses less volume within the housing than the conventional shutoff door.

In one embodiment, the guides may be tracks molded into the housing and the followers may be pins attached to the edges of the panels. The pins slide within the tracks when the door is moved between open and closed positions. The actuating means includes at least one link connected between at least one of the door panels and a control knob. The control knob is located adjacent the housing and partially extends out from the dashboard of the vehicle. To open or close the door, the operator moves the knob in one direction or the other. Depending on which way the control knob is turned, the link either pulls or pushes the door between open and closed positions. In another embodiment, the actuating means may be a rod that is attached to at least one of the panels and extends out from the side of the air housing and the vehicle dashboard. The door is opened and closed by pulling or pushing the rod.

These and other features and advantages of the invention will be more fully understood from the following description of certain specific embodiments of the invention taken together with the accompanying drawings.

DESCRIPTION OF THE PREFERRED EMBODIMENT

Figure 1:
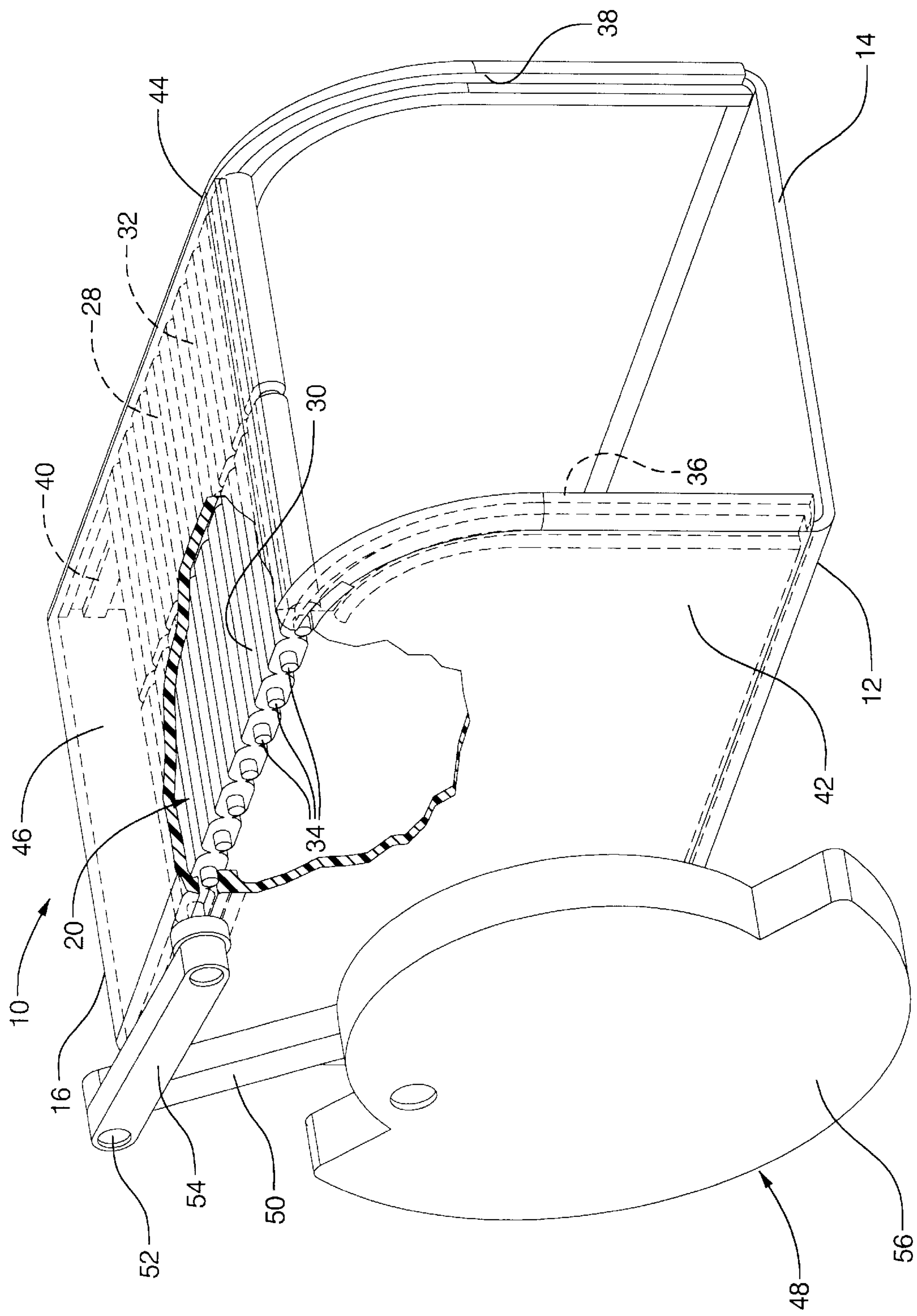
FIG. 1 is a perspective view of a vehicle air outlet assembly illustrating a shutoff door in the open position in accordance with one embodiment of the present invention.
Figure 2:
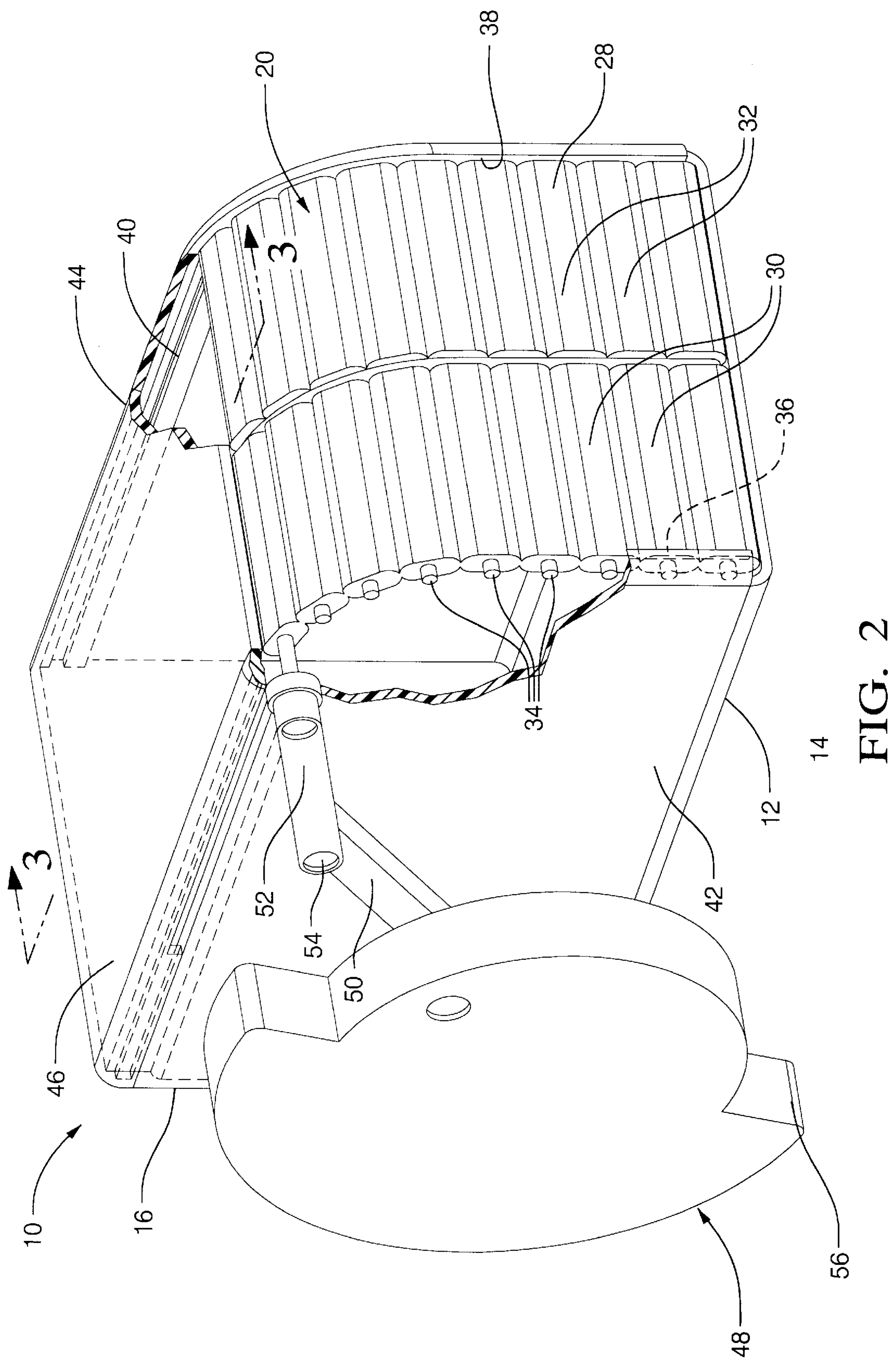
FIG. 2 is a perspective view of the vehicle air outlet assembly of FIG. 1 illustrating the shutoff door in the closed position.
Figure 3:
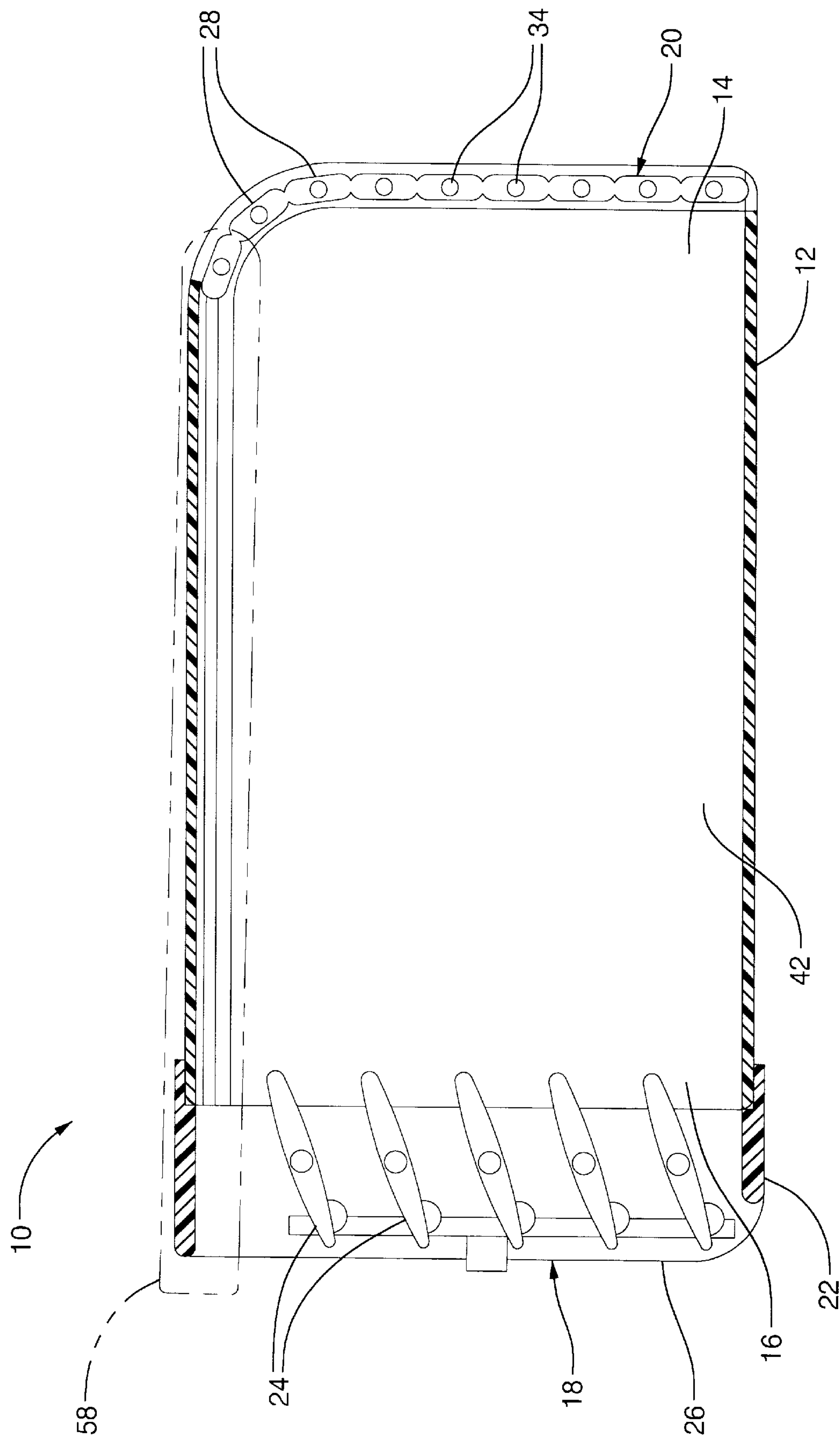
FIG. 3 is a side view of a vehicle air outlet assembly in accordance with another embodiment of the invention.

Referring now to FIGS. 1–3 of the drawings, numeral 10 generally indicates an air outlet assembly for supplying air to an automotive vehicle interior compartment. Air outlet assembly 10 has a housing 12 that includes inlet and outlet ends 14, 16. An air directionality control device 18 is located at the outlet end 16 to control the direction of airflow out of the assembly 10. A shutoff door 20 is located at the inlet end 14 to block air flowing through the housing 12 and is slidable into a position parallel to one side of the housing 12 to unblock airflow through the housing 12.

The housing 12 is a substantially rectangular member to be mounted within an opening in a dashboard of an automobile (not shown). The housing 12 may be attached to the dashboard using a plurality of mounting features or brackets. The inlet end 14 is connected to an air source (not shown) which recirculates air from the inside of the vehicle or introduces outside air into the vehicle.

The air directionality control device 18 may be a barrel housing 22 as shown in FIG. 3. The housing 12 pivotally supports the barrel housing 22 therein. The barrel housing 22 is generally cylindrical in shape. The barrel housing 22 includes a plurality of vanes 24 extending across an outlet opening 26 of the barrel housing 22. The barrel housing 22 can either be pivoted upward and downward or from side to side, to direct the air flowing out of the assembly 10 in the desired direction.

Alternatively, or in addition, the air directionality control device 18 may be a plurality of louvers each having first and second louver ends pivotally connected to control means. The control means may be a knob connected to at least one louver whereby the louvers are pivoted by moving the knob to provide the desired direction of airflow from the air outlet assembly 10.

The door 20 is made of a plurality of elongated horizontally extending panels 28 hingedly connected together vertically. The panels may be connected together with a hinge connector such as eared hinges with one of the ears being attached to the upper edge of a panel and the other ear attached to the lower edge of a subsequent panel. Also, as shown in the figures, the panels may be connected together by molding the panels together by creating a thin strip between the panels which acts as a flexible hinge between the panels. Each horizontal panel 28 may be formed from two interconnecting laterally spaced panels 30,32 of similar length. The length of each laterally spaced panel 30,32 is approximately equal to one half of a width of the inlet end 16 of the housing 12.

Pins 34, integral to the panels 28, are engaged along laterally opposite edges 36,38 of the panels 30,32. Guides or tracks 40 are integrally molded into opposite sides 42,44 of the housing 12. Pins 34 slide within the tracks 40 and carry the panels 28 along to allow the door 20 to roll up into side 46 of the housing 12 as shown in FIG. 1 and roll down to block the inlet end 14 of the housing 12 as shown in FIG. 2. Alternatively, any other type of follower member may be used instead of pins 34 to slide within the tracks 40 and allow the door 20 to open and close.

The shutoff door 20 is controlled by actuating means 48 that are located adjacent the housing 12 and partially extend outwardly from the dashboard. The actuating means 48 may be two links 50,52 pivotally interconnected by a pin 54 as shown in FIGS. 1 and 2. One link 50 is attached to a control knob 56 and the other link 52 is attached to a door panel 28. The control knob 56 may have any convenient shape and be attached to the side 42 of the housing 12 by a pin (not shown). When the control knob 56 is moved, the links 50,52 either pushes or pulls the door 20 into the closed or opened position. The control knob 56 may be intermediately positioned to slide the door 20 between discrete positions depending on the volume of air desired in the vehicle's interior compartment.

In another embodiment, the actuating means 48 may be a rod 58 attached to at least one door panel 28 as shown in FIG. 3. The rod 58 is located adjacent the housing 12 and extends outwardly from the dashboard. The door 20 slides between open and closed positions by pulling or pushing the rod 58.

While the invention has been described by reference to certain preferred embodiments, it should be understood that numerous changes could be made within the spirit and scope of the inventive concepts described. Accordingly it is intended that the invention not be limited to the disclosed embodiments, but that it have full scope permitted by the language of the following claims.

What is claimed is:

1. A vehicle air outlet assembly comprising:

a housing having a tubular form including inlet and outlet ends and defining an air passage between the ends;

a sliding shutoff door movable between an open position along one side of the housing and a closed position across said inlet end of the housing to control air flow through the air outlet assembly, said door having a plurality of panels hingedly connected together and including followers along laterally opposite edges of the panels;

a plurality of vanes extending across said outlet opening;

guides formed on opposite sides of the housing and receiving the panel followers for guiding sliding movement of the door between open and closed positions, respectively, unblocking and blocking the inlet end of the housing to the passage of air therethrough; and actuating means connected with one of the door panels for sliding the door panels between the open and closed positions.

2. A vehicle air outlet assembly as in claim 1 wherein the followers are pins that slide within the tracks to open and close the shutoff door.

3. A vehicle air outlet assembly as in claim 1 wherein the guides are tracks integrally molded into the opposite sides of the housing.

4. A vehicle air outlet assembly as in claim 1 wherein the actuating means includes at least one link connected between a control knob and one of the door panels whereby the door slides between open and closed positions by rotating the control knob.

5. A vehicle air outlet assembly as in claim 1 wherein the actuating means includes a rod connected to one of the door panels whereby the door slides between open and closed positions by pushing and pulling the rod.

* * * * *